United States Patent [19]
Sun

[11] Patent Number: 5,418,054
[45] Date of Patent: May 23, 1995

[54] FLAME-RETARDANT, WATERPROOF AND BREATHABLE EXPANDED PTFE LAMINATE

[75] Inventor: Kwok K. Sun, Elkton, Md.

[73] Assignee: W. L. Gore & Associates, Inc., Newark, Del.

[21] Appl. No.: 33,652

[22] Filed: Mar. 16, 1993

[51] Int. Cl.$^6$ .................. B32B 5/14; B27N 9/00; C09K 21/00
[52] U.S. Cl. .................. 428/308.4; 252/608; 252/609; 428/317.1; 428/422; 428/423.1; 428/920; 528/72
[58] Field of Search .............. 428/308.4, 317.1, 422, 428/921, 423.1, 920; 156/307.3, 331.1, 331.7, 332; 521/106, 107, 108, 128; 252/608, 609, 610; 528/59, 60, 66, 72, 77, 75

[56] References Cited

U.S. PATENT DOCUMENTS

| | | | |
|---|---|---|---|
| 3,953,566 | 4/1976 | Gore | 264/288 |
| 4,061,696 | 12/1977 | Vollmer et al. | 260/930 |
| 4,212,953 | 7/1980 | Sheratte et al. | 521/137 |
| 4,532,316 | 7/1985 | Henn | 528/59 |
| 4,743,624 | 5/1988 | Blount | 521/106 |
| 4,812,524 | 3/1989 | Baghdachi | 525/194 |
| 4,816,328 | 3/1989 | Saville et al. | 428/246 |
| 5,137,777 | 8/1992 | Silverman et al. | 428/921 |
| 5,145,883 | 9/1992 | Saito et al. | 428/317.9 |

FOREIGN PATENT DOCUMENTS 0525409  6/1992  European Pat. Off. .

Primary Examiner—Paul J. Thibodeau
Assistant Examiner—Stephen Sand
Attorney, Agent, or Firm—Gary A. Samuels

[57] ABSTRACT

A waterproof and breathable flame-retardant laminate of two layers of porous expanded polytetrafluoroethylene laminated together by a flame-retardant adhesive layer of poly(urea-urethane) polymer containing phosphorus ester groups built into the chains of the polymer. The flame-retardant components do not wash out of the adhesive and laminate under repeated laundering or dry cleaning.

7 Claims, 1 Drawing Sheet

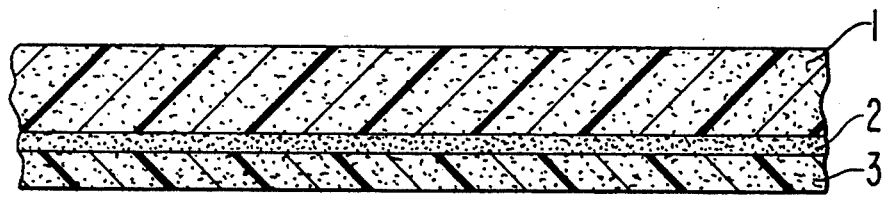

FLAME-RETARDANT, WATERPROOF AND BREATHABLE EXPANDED PTFE LAMINATE

FIELD OF THE INVENTION

The invention relates to the field of flame-retardant materials, particularly to fabrics and laminates utilized in protective garments to provide durable flame-retardance along with other useful properties.

BACKGROUND OF THE INVENTION

Flame-retardant compositions are generally applied to the surfaces of materials, such as fabrics and laminates. The flame-retardant materials may be liquids or may be applied as solutions in a solvent or emulsified in a liquid. The liquids are usually sprayed on the substrate to be rendered flame-resistant or padded on from rolls. The flame-retardant may also be forced into pores and interstices of the substrate under pressure so that the flame-retardant occupies pores and cracks within the substance of the substrate, such as disclosed in U.S. Pat. No. 4,223,066. In the presence of heat or flame, the flame-retardants usually undergo chemical reaction or physical change to render the substrate flame-resistant. Polymers or resins are also often used to aid in adhering the flame-resistant material to the substrate.

The principal problem which often causes surface coating of substrates to be deficient in rendering the substrates flame-retardant is the tendency of most surface coatings to washing off of the substrates under conditions of cleaning or laundering. After a few cleanings, a surface coated flame retardant most often washes away to leave a fabric or laminate thus coated unprotected against flame or heat. Use of resinous materials, adhesives, and other such ingredients usually only delays wash removal of the flame-retardant material or causes it to break away from the substrate when under heat.

The present invention provides a permanently incorporated flame-retardant material into the structure of a laminate so that cleaning and applied heat or flame have no effect on its permanence in the substrate.

SUMMARY OF THE INVENTION

The invention comprises a flame-retardant, waterproof and breathable laminate of a first layer of porous expanded polytetrafluoroethylene (ePTFE) membrane adhered to a second layer of ePTFE by a phosphorus-containing poly(urea-urethane) adhesive. One layer of ePTFE may vary from the other considerably in thickness. The adhesive comprises a reaction product of at least one long chain polyglycol, at least one short chain glycol, at least one phosphorus ester containing polyglycol, and excess polyisocyanate. This adhesive is preferably moisture cured to become a solid piece of poly(urea-urethane) sheet adhered to the ePTFE sheets. Mixtures of several long chain polyglycols, several short chain glycols, several phosphorus ester containing polyglycols may be used as well as mixtures of several polyisocyanates. The long chain polyglycol is preferably selected from various polyether and polyester polyglycols of varying molecular weight and degrees of polymerization. The short chain glycol is preferably selected from straight, branched, and ring containing aliphatic $C_{1-10}$ diols. The polyisocyanate is preferably a diiocyanate but may contain some isocyanate having more than two isocyanate groups. A preferred isocyanate is MDI (polymethylene polyphenylene diisocyate).

The phosporus-containing polyglycols useful in the invention to provide flame retardancy to the adhesive and to the laminate as a whole comprise one or more of:

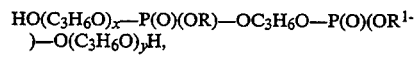

where $x+y=2-10$, $R=C_{1-6}$ alkyl, $R^1=C_{1-6}$ alkyl, and

where: $R=C_{1-6}$ alkyl, $R^1=C_{1-6}$ alkyl, $n>>m$, and $n+m=2-20$.

BRIEF DESCRIPTION OF THE DRAWING

The FIGURE shows a cross-sectional view of a laminate of the invention.

DETAILED DESCRIPTION OF THE INVENTION

The FIGURE describes a laminate of the invention in which a first relatively thick layer 1 of ePTFE membrane is adhered to a relatively thin layer 3 of ePTFE membrane by a layer of poly(urea-urethane) adhesive 2 which contains phosphorus ester groups as an integral part of the polymer chain of the adhesive 2.

The ePTFE membranes used to form a laminate of the invention are those disclosed and described in detail in U.S. Pat. Nos. 3,953,566, 3,962,153, 4,096,227, 4,187,390, 4,902,423, and 4,478,665, assigned to W. L. Gore & Associates, Inc. The porous membranes of ePTFE have a microstructure characterized by nodes interconnected by fibrils and are highly porous and of high strength. The ePTFE membranes are waterproof and breathable owing to the high resistance to wetting of ePTFE by water and to their high porosity. When coated with a hydrophilic layer, particularly of hydrophilic polyurethane, they remain waterproof and oil resistant, retaining their waterproofness as the hydrophilic layer blocks the penetration of oils throughout the membrane with consequent loss of waterproofness. These properties are fully described in detail in U.S. Pat. No. 4,194,041, assigned to W. L. Gore & Associates, Inc.

The poly(urea-urethane) adhesive layer 2 in the laminate of the invention provides similar properties of waterproofness and breathability as those described in the above patent, but in addition confers a high degree of flame resistance to ePTFE laminates made from it, since the phosphorus the adhesive contains is embodied in the molecule of a polyglycol ingredient and thus into the chains of the poly(urea-urethane) polymer molecules prepared therefrom. Cleaning, washing, and scrubbing of a garment made from a laminate containing the above adhesive thus do not remove any of the permanent flame resistant component of the adhesive and a laminate containing the adhesive.

Suitable short chain glycols up to about $C_{12}$, which may be useful in the adhesive include, for example, ethylene glycol-(1,2), propylene glycol-(1,2) and -(1,3), butylene glycol-(1,4) and -(2,3), pentandiol-(1,5), hexanediol-(1,6), octandiol-(1,8), 1,7-heptanediol, neopentyl glycol, 1,4-bis(hydroxymethyl)cyclohexane, 2-methyl-1,3-propanediol, trimethylolpropane, diethyleneglycol, and triethyleneglycol.

Useful long chain polyglycols, of about 500-5000 mol. wt., include, for example, polyoxyethylene glycol, polyoxypropylene glycol, polyoxybutylene glycol, polytetramethylene glycol, block copolymers, such as combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides.

Also useful may be hydroquinones and low molecular weight aliphatic ring-containing diols. Mixtures of the glycols of different chain lengths and molecular weights as well as of diols of differing chemical composition may be used. Aromatic glycols should not be used.

Certain amounts of polyester glycols may be included, such as lower molecular weight reaction products of aliphatic glycols or ethylene or propylene oxide with aliphatic dicarboxylic acids, for example.

In principle, in the invention, any aliphatic, cycloaliphatic, araliphatic aromatic and hetrocyclic di and/or polyisocyanates can be used. Specific examples include ethylene diisocyanate; 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and any mixtures of these isomers, 1-isocyanato-3,3,5-trimethyl-5-isocyanatomethylcyclohexane, 2,4- and 2,6-hexahydrotolylene diisocyanate and any mixtures of these isomers, hexahydro-1,3- and-/or -1,4-phenylene diioscyanate; perhydro-2,4'- and/or -4,4'-diphenylmethane diisocyanate, 1,3- and 1,4-phenylene diisocyanate, 2,4- and 2,6-tolylene diisocyanate and any mixtures of these isomers, diphenylmethane 2,4'- and/or -4,4'-diisocyanate, naphthylene 1,5-diisocyanate, and polyphenylenepolymethylene polyisocyanate (MDI). MDI is the most preferred diisocyanate used to form the adhesive.

The adhesive is prepared typically as follows:

EXAMPLE 1

The phosphorus-containing flame-retardant adhesive was prepared by heating 50.05 g. (0.400 equivalent) of MDI, 82.77 g.(0.112 equivalent) poly(ethylene-propylene) glycol, and 3.15 g. (0.070 equivalent) 1,4-butanediol under dry nitrogen gas for two hours. To the reaction mixture was then added 32.45 g. (0.065 equivalent) $HOCH_2CH_2[OP(O)(OCH_3)OCH_2CH_2]_m[OP(O)(CH_3)OCH_2CH_2]_n OH$, and the mixture stirred another 1.5 hours to form an isocyanate terminated phosphorus-containing urethane adhesive of viscosity 16,000 cps at 80° C., NCO group content was 3.56 wt. %.

The adhesive was applied to a relatively thick ePTFE membrane by doctor blades or roller methods commonly used in the lamination arts and the adhesive covered with the thinner ePTFE membrane to form a laminate. The thickness of the adhesive layer can be from 0.1 to 5.0 mils. This laminate was cured at ambient condition for at least two days to allow the adhesive to convert by moisture to a phosphorus-containing poly(urea-urethane) layer. Use of a very thin, almost gossamer layer of ePTFE to cover the adhesive on the thick ePTFE layer allows the laminate to be rolled up for storage while the adhesive cures over about two days. Otherwise the adhesive would stick to other layers or materials it might contact until it is cured to the non-tacky stage.

Flame Test

Three specimens of the cured laminate prepared above were tested for flame-retardance according to standard method FTM 191-5903.1. The flame-resistance method is a vertical flame test using a mixed gas flame and 12-second flame impingement on the samples. Any after flame, after glow, and char length are recorded for each speciment. The average results were:

| | |
|---|---|
| After flame (seconds) | 0 |
| After glow (seconds) | 0 |
| Char length (inches) | 4.1 |

EXAMPLE 2

Another phosphorus-containing flame-retardant adhesive was prepared according to the same procedure as for Example 1, except the following starting materials were used: 50.05 g (0.400 equivalent) MDI; 82.77 g (0.112 equivalent) poly(ethylene-propylene)glycol, 4.73 g (0.080 equivalent) 1,4-butanediol, and (0.045 equivalent) 14.72 g phosphorus-containing glycol $[HO(C_3H_6O)_x-P(O)(OC_4H_9)-OC_3H_6O-P(O)(OC_4H_9)-O(C_3H_6O)_yH]$. The adhesive prepared from these starting materials had a viscosity of 7500 cps at 80° C. and an NCO content of 3.98 wt. %.

A laminate of a thick and a thin ePTFE membrane, similar to the one described in Example 1, were made using the above adhesive. After moisture curing for two days, these ePTFE membranes were further laminated onto Nomex III fabric.

Flame Test

The fabric-membranes laminate was subjected to the same vertical flame test (FTM 191-5903.1) as in Example 1. After five washing cycles at 140°±5° F., the laminate was tested again. The results of both before and after washing are given below. Each number is the average result of five tests.

| | Before Wash | | After Wash | |
| | Warp | Fill | Warp | Fill |
|---|---|---|---|---|
| After Flame (seconds) | 0.0 | 0.0 | 0.0 | 0.0 |
| After Glow (seconds) | 1.6 | 1.5 | 1.4 | 1.5 |
| Char Length (inches) | 1.8 | 1.6 | 1.9 | 1.7 |

The laminate of the invention is useful for clothing used in fire fighting, military uniforms, protective clothing for rescue workers, and for infant garments and bedding. Since the fire-retardant components of the laminate are built into the polymer chains of the adhesive uniting the ePTFE membranes, which are themselves somewhat fire-retardant, the fire-retardant materials advantageously do not wash out of garments when they are washed, dry cleaned, or heavily used. This laminate may be further laminated onto Nomex meta-substituted polyaramide or other flame-resisting fabrics for use in protective clothing.

I claim:

1. A waterproof and breathable flame-retardant laminate comprising:
   (a) a first layer of porous expanded polytetrafluoroethylene membrane adhered to a
   (b) second layer of porous expanded polytetrafluoroethylene membrane by a layer of (c) phosphorus-containing poly(urea-urethane) adhesive.

2. A laminate of claim 1 wherein said poly(urea-urethane) adhesive comprises a reaction product of at least one long chain polyglycol of molecular weight of about 500 to about 5000, at least one short chain glycol of up to about 12 carbon atoms, at least one phosphorus ester containing polyglycol, and polyisocyanate.

3. A laminate of claim 2 wherein said long chain polyglycol is selected from the group consisting of a polyethylene glycol, a polypropylene glycol and a polyester glycol and combinations and mixtures thereof.

4. A laminate of claim 2 wherein said short chain glycol is selected from the group consisting of aliphatic straight, branched chain, or ring-containing $C_{1-10}$ diols.

5. A laminate of claim 2 wherein said phosphorus ester containing polyglycol comprises one or more of:

$$HO(C_3H_6O)_x\text{—}P(O)(OR)\text{—}OC_3H_6O\text{—}P(O)(OR^1)\text{—}O(C_3H_6O)_yH,$$

where $x+y=2-10$, $R=C_{1-6}$ alkyl, $R^1=C_{1-6}$ alkyl, and $$HOCH_2CH_2[OP(O)(OR)OCH_2CH_2]_m[OP(O)(R^1)OCH_2CH_2]_nOH,$$

where: $R=C_{1-6}$ alkyl, $R^1=C_{1-6}$ alkyl, $n \gg m$, and $n+m=2-20$.

6. A laminate of claim 1 wherein said adhesive is moisture-cured.

7. A laminate of claim 1 wherein said first layer of porous expanded polytetrafluoroethylene membrane is thicker than said second layer of porous expanded polytetrafluoroethylene.

* * * * *